April 21, 1959  J. C. JENKINS  2,883,215
WELDING STUD
Filed Nov. 22, 1955
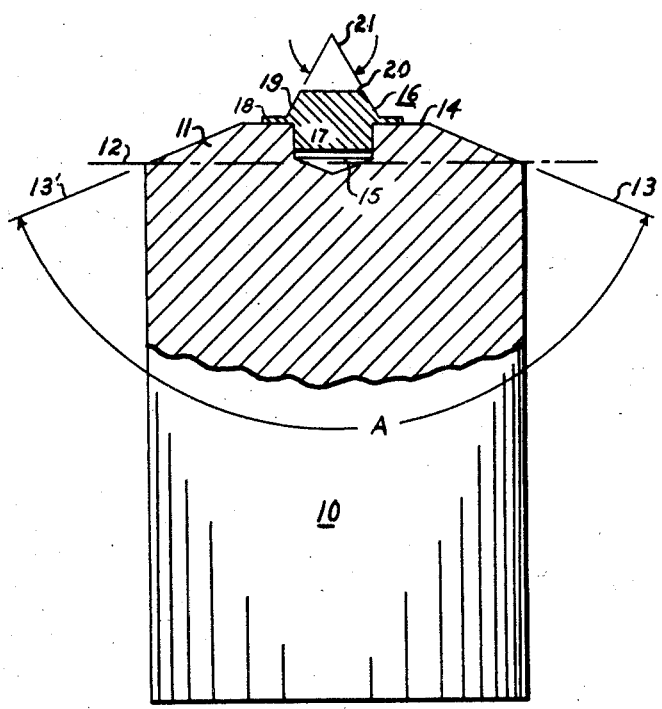
INVENTOR.
BY John C. Jenkins
Clyde H. Haynes
his atty.

United States Patent Office 2,883,215
Patented Apr. 21, 1959

2,883,215

WELDING STUD

John C. Jenkins, Lorain, Ohio, assignor to Gregory Industries, Inc., Detroit, Mich., a corporation of Michigan Application November 22, 1955, Serial No. 548,427

3 Claims. (Cl. 287—20.2)

This invention relates to rods or studs used for stud welding and in particular to the shape of the welding end of a rod or stud having a solid flux piece.

At the present time, there is in common usage a granular flux filled stud such as illustrated in United States Patents Nos. Re. 22,411 and 2,402,659 issued to Nelson on May 11, 1943, and June 25, 1946, respectively, as well as a generally termed slug loaded stud as illustrated in Patent No. 2,612,394 issued September 30, 1952, to Nelson. Up until this time, these studs could not be interchanged or intermixed since the variation in the types of fluxing on the welding ends of the studs required different power settings. The power setting, including welding current, voltage and time, for the slug loaded stud has been different than the power setting for the granular flux filled studs if good welds were to be obtained with both studs. Under these conditions, an operator in the past has not been able to set his welding equipment so that he could weld either type of stud interchangeably. The operator found borderline applications where they had sufficient power and flexibility and equipment for welding granular flux filled studs but could not weld the so called slug loaded studs of the same diameter or cross section dimension effectively. These borderline applications arise when the maximum power output of the generator is required and then extra lengths of cable are inserted in the welding lines so that the stud welding can be performed at the job site and up to two or three hundred feet away from the welding generator.

It has also been found that the stud welding gun adjustments as well as the generator setting and cable lengths were more critical with the prior slug loaded studs than with the granular flux filled studs. The granular flux filled stud has gained prominence in the field because of its not requiring as critical adjustments of welding equipment as are required for the slug loaded studs.

The present invention is directed towards a slug loaded stud which can be interchanged with a granular flux filled stud of the same diameter or cross sectional area. It has been discovered that the slug loaded stud having a welding end as described and disclosed herein can be effectively interchanged with granular flux filled studs of the same diameter.

Therefore, one of the objects of the invention is to provide a slug loaded stud which can be welded with the same power source and stud welding equipment settings required for welding a granular flux filled stud of the same size.

Another object of the invention is to provide a slug loaded stud which can be interchanged with granular flux filled studs.

A further object of the invention is to provide the welding end of a stud with the general shape of a frustum of a cone having an apex angle of approximately 135° and terminating in a flat surface, and a piece of welding flux (slug load) extending in a hole in the surface a distance less than the axial length of the welding end and terminating and extending outwardly in the general shape of a frustum of a cone having an apex angle less than 135°.

Other objects and a fuller understanding of the invention will become apparent from the description and claims and the drawings in which:

The drawing illustrates a cross sectional view of the slug loaded welding stud.

In the drawing, a slug loaded rod or stud incorporating the present invention is illustrated partly in cross section. This stud 10 has a welding end 11 which is an integral portion of the stud 10. The stud or rod 10 is illustrated as being generally cylindrical in shape, however, it is understood that other shapes such as hexagonal or octagonal rod may be used. The welding end 11 is of an arc meltable, weldable grade of metal and has a general shape of a frustum of a cone, having an apex angle A. The apex angle A is that angle between the dimension lines 13 and 13'. The word approximately is used to include angles within a range of about 5% of the stated 135° angle. Thus, the apex angle should fall between about 128° and about 144° for obtaining the best interchangeability of this stud with the granular flux filled studs.

The welding end 11 terminates in a flat surface 14 which is perpendicular to the longitudinal axis of the welding end 11. The welding end 11 also has a flux receiving hole 15 opening on this flat surface 14 and extending coaxially into the welding end.

The size of the surface 14 in relationship to the diameter of the stud is not critical, although it certainly must be relatively small or the important advancement obtained by the geometry of the stud end will be minimized or lost. The surface 14 is provided principally to permit an axial bore to be made and a slug of flux mounted therein. If the flux is to be associated in any other manner, the surface 14 can be advantageously minimized. It appears that the surface 14, therefore, should be a minor fraction of the total cross-section of the stud. The invention, it is to be understood, is principally in the end geometry, and secondarily in the relationship of the flux to such geometry.

The extent of the welding end portion 11 is illustrated by the dash-dot line 12 which, for description purposes separates the welding end portion 11 from the main body of the stud 10.

The welding end 11 is provided with a piece or slug of welding flux 16 which may be aluminum or some other similar material commonly used in fluxing studs for welding. As is illustrated in the drawing, this piece 16 of welding flux covers a major portion of the flat surface 14 and extends into the hole 15 a distance less than the axial length of the welding end 11. The slug or piece 16 may be secured in the hole 15 by deforming the piece by pressing it into the hole or by some other suitable means such as gluing or a threaded connection. That portion of the piece 16 which is within the hole 15 is referred to as the securement portion 17. That portion of the piece 16 immediately adjacent and covering the flat surface 14 is referred to as the cover flange portion 18. The remainder of the piece or slug 16 is termed the extension portion 19. The extension portion 19 of piece 16 is of the general shape of the frustum of a cone having an apex angle less than the apex angle of the welding end, and terminates in a flat surface 20 externally of and coaxially of the welding end. Flat surface 20 is reasonably parallel to the flat surface 14 of the welding end. In the drawing, the apex angle of the extension portion 19 is represented by dimension lines and arrows 21. This apex angle is between about 90° and 120°.

As is illustrated, extension portion 19 and the cover flange 18 have a base diameter less than the diameter of the flat surface 14 and larger than the diameter of the hole 15. As was previously pointed out, studs having a welding end fluxed as herein provided are interchangeable with studs having a welding end provided with granular flux. The present studs are used and welded in the same manner as the granular flux studs and with stud welding equipment in common usage in industry.

Although this invention has been described in its preferred form with a certain degree of particularity enabling others to reproduce the invention, it is understood that the present disclosure has been made by way of example and that numerous modifications and changes in the details may be resorted to without departing from the function and scope of the invention as defined in the claims which are made a part hereof.

The embodiments of the invention in which an exclusive property or privilege is claimed are defined as follows:

1. In a welding stud associated with a flux charge consisting of a mass of fluxing metal supported with respect to the weld end of the stud proper, the improvement comprising, an end surface formation on said stud wherein said end surface is a frustum of a geometric figure which has an apex angle within a range from about 128 degrees to 144 degrees.

2. A stud according to claim 1, wherein the stud is of circular cross-section and the said end surface is a conical frustum.

3. In a welding stud associated with a flux charge consisting of a mass of fluxing metal supported with respect to the weld end of the stud proper, the improvement comprising, an end surface formation on said stud wherein said end surface is a frustum of a geometric figure which has an apex angle within a range from about 128 degrees to 144 degrees, said frustum having a small base which is a minor fraction of the major base area.

References Cited in the file of this patent

UNITED STATES PATENTS

| | | |
|---|---|---|
| 2,670,424 | Martin | Feb. 23, 1954 |
| 2,708,129 | Keleman et al. | May 10, 1955 |
| 2,784,014 | Keleman | Mar. 5, 1957 |